United States Patent [19]
Otte

[11] 3,913,444
[45] Oct. 21, 1975

[54] THERMALLY DEFORMABLE FASTENING PIN

[75] Inventor: Richard F. Otte, Los Angeles, Calif.

[73] Assignee: Raychem Corporation, Menlo Park, Calif.

[22] Filed: Nov. 8, 1972

[21] Appl. No.: 304,821

[52] U.S. Cl. .................. 85/8.3; 29/447; 29/629; 75/175.5; 174/DIG. 8; 339/30
[51] Int. Cl.² .......................................... F16B 21/14
[58] Field of Search ......... 85/8.3; 29/447, 629, 628; 174/DIG. 8, 68.5, 153 G; 339/30, DIG. 1; 75/175.5

[56] References Cited
UNITED STATES PATENTS

| | | | |
|---|---|---|---|
| 1,635,830 | 7/1927 | Gagnon | 339/30 |
| 2,754,716 | 7/1956 | Bourns | 85/8.3 |
| 2,994,933 | 8/1961 | Wolfe | 174/153 G |
| 3,012,882 | 12/1961 | Muldawer et al. | 75/134 N |
| 3,227,030 | 1/1966 | Preziosi et al. | 85/8.3 X |
| 3,243,211 | 3/1966 | Wetmore | 29/447 X |
| 3,285,470 | 11/1966 | Frei et al. | 75/151 X |
| 3,354,260 | 11/1967 | Brandt et al. | 174/68.5 |
| 3,513,429 | 5/1970 | Helsop | 174/DIG. 8 |
| 3,567,523 | 3/1971 | Jackson et al. | 148/11.5 R |
| 3,569,901 | 3/1971 | Connor | 339/30 |
| 3,588,618 | 6/1971 | Otte | 174/DIG. 8 |
| 3,610,813 | 10/1971 | Linderholm | 85/8.3 X |
| 3,622,941 | 11/1971 | Wetmore | 339/98 |
| 3,660,805 | 5/1972 | McDonough | 29/629 X |
| 3,740,839 | 6/1973 | Otte et al. | 339/30 X |

FOREIGN PATENTS OR APPLICATIONS

490,718  8/1938  United Kingdom................... 85/8.3

*Primary Examiner*—Ramon S. Britts
*Attorney, Agent, or Firm*—Lyon & Lyon

[57] ABSTRACT

A fastening pin for use in connecting printed circuit boards or the like constructed of concentrically arranged split tubes or layers of material having different thermal properties. One tube is made from a heat recoverable metal alloy, that is, a metal alloy that can be caused to exhibit a decided reduction in strength and be deformed when it passes through a transition point in a first direction and a reverse change in dimension and increase in strength when it passes through the transition point in the opposite direction. The other tube is resilient and has spring like characteristics so that it has sufficient strength to move the first tube of material when the latter is in its low strength condition, and sufficient flexibility to be moved by the first tube of material when it changes dimension. The pins are formed by taking split cylinders of each material and force fitting the tube of heat recoverable metal inside the tube of spring metal. Also disclosed is a similar pin wherein two layers of heat recoverable metal are used to sandwich a layer of spring like material, and a sectionalized pin which permits substantially independent motion by different segments thereof.

10 Claims, 5 Drawing Figures

THERMALLY DEFORMABLE FASTENING PIN

RELATED APPLICATIONS

Ser. No. 157,890 filed June 29, 1971 by the present inventor and Christopher L. Fischer, now U.S. Pat. No. 3,740,839; Ser. No. 264,782 filed June 21, 1972 by the present inventor, now U.S. Pat. No. 3,783,429; both applications are assigned to the assignee of the present application, and their disclosures are incorporated by reference herein.

BACKGROUND OF THE INVENTION

Many types of fasteners are known for aligning and fastening in place a plurality of sheets of material, for example, sheets of metal as used in aircraft fabrication and printed circuit boards in electrical assemblies. One frequently used fastener for such a purpose is called a roll pin comprises a piece of spring steel rolled into a tubular configuration with a slight split left open at the mating edges. When such pins are driven into a series of aligned holes having slightly smaller diameters than that of the pin, the outer diameter of the roll pin will be caused to contract. The spring forces of the sheet steel will, however, cause the pin to expand outwardly to the extent possible and exert a force on the edges of the holes through which it was driven and form a secure connection between them.

While such fasteners are satisfactory in many instances, they possess certain inherent disadvantages which makes their use difficult if not impossible in some applications. For example, the holes through which the pin is driven must be of uniform diameter in order for the pin to securely engage each sheet as the various sections of the pin are not capable of substantial differential re-expansion. Because of space limitations or the fragility of the material from which the sheets to be connected is made, it is often impossible to initially drive these pins into place. It is also difficult if not impossible to remove such pins once installed and this is a substantial disadvantage when replacement or repair is required. These disadvantages are particularly present when it is desired to interconnect a stack of printed circuit boards, such that the connection can carry heat or electrical energy, since such boards are relatively fragile and subject to damage necessitating their replacement or repair.

SUMMARY OF THE INVENTION

The present invention solves these problems by providing a fastening pin which is thermally deformable in a manner which permits it to assume a first configuration when at an elevated temperature and a second, smaller, configuration when at a reduced temperature. This is accomplished by constructing a roll pin out of two or more cooperating tubular members, one of which is fabricated from a heat recoverable metal alloy and the other of which is fabricated from a material having pronounced spring characteristics. By positioning one member within the other, the interaction of the two materials as the heat recoverable material passes through its transition temperature will cause the fastening pin to expand or contract in the transverse dimension. This can be made to occur because the heat recoverable metal alloys employed in the invention are characterized in having very low strength when cooled to below their transition temperature and very high strength when heated to above their transition temperature. Such alloys are also characterized by their ability to be deformed into a heat unstable condition when below the transition temperature and to then reassume a heat stable condition when heated to above the transition temperature. According to the present invention, these properties may be utilized by positioning a tubular member of such an alloy within a tubular member of spring like material so that when the combined tubes are cooled below the transition temperature of the heat recoverable metal alloy the spring member will dominate with the result that the tube will have a small diameter, while when the tubes are heated to above the transition temperature of the heat recoverable metal alloy, the tube constructed of the same will reassume its heat stable configuration and expand the spring member with the result that the pin has a larger diameter. Conversely, the tube of spring material may be positioned within the tube of the heat recoverable alloy so that the member will have a larger diameter when cooled and a smaller diameter when heated.

A fastening pin constructed in accordance with the present invention thus can be provided with substantially zero insertion force and can easily be installed while cold through a series of holes formed in sheets of material to be connected. Immediately after installation, the pin is permitted to rise in temperature with the result that the heat recoverable inner member expands to force the outer spring member into secure engagement with the various sheets of material being connected. The tube will expand until it touches the sides of the hole and presses firmly against them. If different sheets have holes of different diameters, the corresponding portion of the pin will simply open further. Thus, a great advantage of the present invention is that the holes in the members of a stack of sheets need not be precisely the same size. If the fastening pin is to be removed, it is only necessary to pass a cooling fluid through it so that the spring member again predominates and the diameter of the pin is reduced.

DESCRIPTION OF THE INVENTION

In order to understand the present invention more completely, it is helpful to understand certain properties of the metals from which the fastening pins of the present invention may be made. While the following discussion, and all of the theories and principles expressed herein, set forth the best information presently available to me, they are set forth only to further an understanding of the invention and are not to be considered in any manner restrictive of the invention, or necessary to its operability or utility.

As used herein, the term "heat recoverable" is used to describe a material which has been deformed from an original heat stable configuration to a different configuration in which it will remain until raised above a certain temperature upon which it will return to its heat stable configuration. The deformation used to place the material in the heat unstable configuration is usually referred to as "thermally recoverable plastic deformation." A material which may be so deformed and recovered is usually referred to as a material capable of having the property of heat recoverable ability imparted thereto. The temperature in which changes in strength and configuration occur upon heating is referred to as the "transition temperature." It should be understood that the transition temperature may be a temperature range, and that a hysteresis usually occurs which causes the precise temperature at which a transition takes place to depend on whether the temperature is rising or falling. Further, the transition temperature is a function of other parameters including the stress applied to the material, the temperature rising with increasing stress.

Examples of metallic materials which are capable of having the property of heat recoverability imparted thereto are the alloys disclosed in U.S. Pat. Nos. 3,012,882, 3,174,851 and Belgium Pat. Nos. 703,649, 749,851, 758,861, & 758,862 as well as U.S. patent applications Ser. Nos. 51,809 and 52,112, both filed July 2, 1970 and assigned to the assignee of the present application, the disclosures of which are incorporated by reference herein to illuminate the background of the present invention. Such alloys have the further characteristic of exhibiting vastly different physical properties at different temperatures, i.e., they can be made to convert from a relatively strong austentic state to a relatively weak martensitic state by reducing the temperature of the alloy to below its transition temperature. However, it is to be understood that the present invention is not limited to the use of any particular type of heat recoverable material but rather comprehends the use of any heat recoverable material possessing the characteristics described above.

Figure 1:
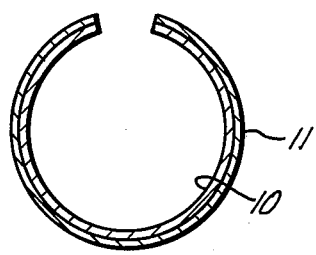
FIG. 1 is a cross-sectional view of a first embodiment of the fastening pin of the present invention.
Figure 2:
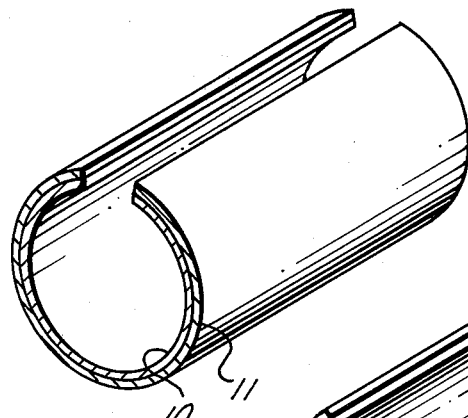
FIG. 2 is a perspective view of the fastening pin of FIG. 1 shown in its cooled or contracted configuration.
Figure 3:
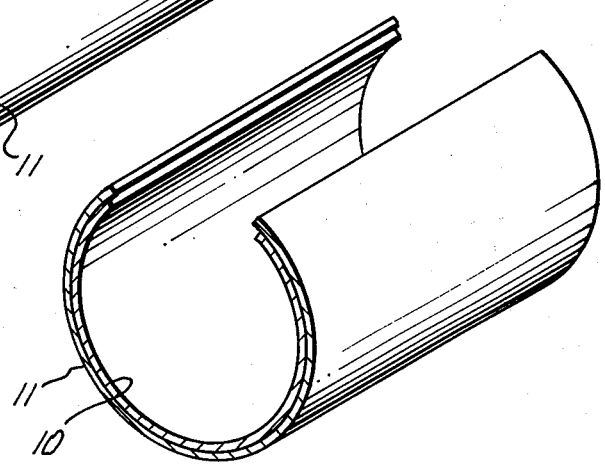
FIG. 3 is a perspective view of the fastening pin of FIG. 1 shown in its warm or expanded configuration.

Turning now to FIGS. 1, 2 and 3 there is illustrated a first embodiment of the present invention. As can be seen, the fastening pin is constructed of an inner split tube 10 of a heat recoverable metal such as an alloy of titanium and nickel and an outer split tube of spring material such as beryllium copper. As shown in FIGS. 1 and 2, the fastener is in the reduced diameter or cold configuration state. In this state, the strength of the inner tube 10 of heat recoverable metal is quite low and the collapsing forces exerted by the outer tube 11 of the spring material are sufficient to deform the inner tube 10 so that the overall diameter of the pin is determined primarily by the characteristics of the spring tube 11. FIG. 3 shows the same fastening pin after it has been heated above the transition temperature of the heat recoverable metal material of the tube 10. In this state, the heat recoverable metal of the tube 10 exerts substantial forces in returning to its heat stable condition, forces sufficient to overcome the spring force of the tube 11 and move it outwardly. It has been found that a significant amount of relative sliding motion takes place at the interface of the two tubes 10 and 11 as they open and close. Because of the counteracting forces of the heat recoverable material of the tube 10 and the spring material of the tube 11, the change in shape of the fastening pin illustrated by FIGS. 2 and 3 is readily reversible upon heating or cooling the pin to above or below its transition temperature.

A fastening pin according to FIGS. 1, 2 and 3 was constructed with an outer tube 11 of gold plated beryllium copper and an inner tube 10 of an alloy of titanium and nickel with an $M_s$ at zero stress of $-10°C$. or so. The outer tube 11 had a wall thickness of 0.005 inches, an outer diameter of 0.114 inches, and a longitudinal slot cut therein with a 0.012 inch saw. The titanium nickel tube 10 had an outer diameter of 0.115 inches and a wall thickness of 0.0095 inches. This tube was made by grinding a piece of stock to 0.0095 inches from a thickness of 0.012 inches to 0.017 inches, annealing it, bending it into a tube, and sizing it by cooling it to the temperature of liquid nitrogen, then putting it into a 0.114 inch hole drilled into a solid block and then permitting its temperature to rise above its transition temperature. The surface was then cleaned by dipping the part into a 50–50 mixture of hydrofluoric and nitric acids for about one second.

The two parts 10 and 11 were assembled by cooling both in liquid nitrogen, expanding the outer tube 11 with a pin of suitable size, then pushing in the inner tube 10 and shoving out the pin until the two split tubes were together with their slots aligned. When cooling to the temperatures of liquid nitrogen and warming to room temperature the maximum outside dimension of the fastener changed from 0.126 inches to 0.117 inches.

An alternative heat shrinkable alloy suitable for use in these devices is a beta brass as described in several of the references cited earlier. They offer the potential of lower cost, better electrical and thermal conductivity, and easier formability. The alloy made using a composition of 64.6% copper, 34.4% zinc, and 1.0% Si by weight are believed to be particularly appropriate. The surface of these alloys should be plated with a suitable material, such as gold, to give them good corrosion resistance. The tube wall thickness may be increased in some applications to compensate for the somewhat lower strength than the nickeltitanium.

Figure 4:
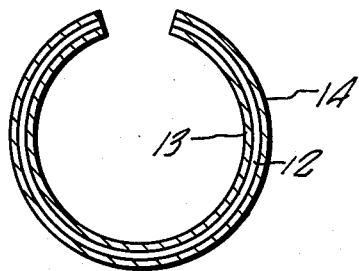
FIG. 4 is a cross-sectional view of a second embodiment of the present invention.

FIG. 4 shows a second embodiment of a fastening pin according to the present invention. In this embodiment, a layer of spring material 12 is positioned between an inner layer 13 and an outer layer 14 of a heat recoverable metal. Such an assembly is preferably constructed by shaping a laminate in which the three layers are clad together. A sandwich of this type can be made to open and close on heating in a manner similar to that shown in FIGS. 2 and 3 if it is given the correct thermal mechanical treatment after cladding and rolling into the tubular pin illustrated.

For example, if the center layer is berryllium copper and the outer layers are titanium nickel alloy, such a treatment may comprise solution annealing the beryllium copper and annealing the titanium nickel alloy by molding the pin at 790°C. for 1 hour and quenching into water; precipitation hardening the beryllium copper by holding the tube at 300°C. for three hours; and cooling the assembly to the temperature of liquid nitrogen and deforming it by rolling the tube tighter by an amount sufficient to strain the beryllium copper outer fibers by about 3 percent. If this treatment is followed, the pin will assume the configuration in which it was precipitation hardened when heated and assume the deformed or tighter configuration when cooled. While other heat treatment conditions and working combinations of materials can be used, the combination described is particularly satisfactory due to the spring properties of beryllium copper and the compatability of its heat treatment requirements with the properties of the titanium nickel alloy. Regardless of the combination of materials used, the most important step in the heat treatment-working cycle is to cool the laminated tubing below the $M_f$ temperature of the heat recoverable alloy before deforming the spring metal member to its final shape. Under these conditions, the heat recoverable alloy can take a large amount of strain without its heat stable configuration being affected.

Figure 5:
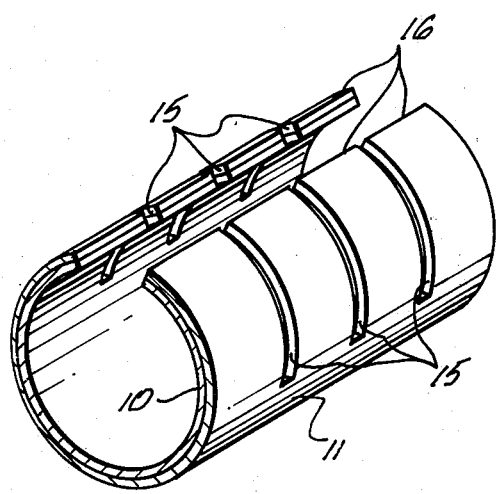
FIG. 5 is a perspective view of a third embodiment of the present invention.

FIG. 5 illustrates a third embodiment of the present invention. The fastening pin illustrated in this figure is similar to that shown in FIGS. 1, 2 and 3 in that it has an inner tube 10 of heat recoverable metal material and an outer tube 11 of spring material. In this embodiment, however, a plurality of partial circumferential slots 15 are formed in the tubular pin to form a plurality of individual sections 16 which can act independently to enable the pin to more readily accommodate itself to different size openings in which it may be positioned.

The rolled circular geometry used with all three of the embodiments illustrated has several advantages. It is relatively easy to fabricate parts with this type of geometry. The tubular nature of the configuration provides a convenient and controllable path for getting cooling or heating fluid to the desired surface. In the embodiments shown in FIGS. 1, 2, 3 and 5, the outer beryllium copper tube acts as somewhat of an insulator to keep other parts of the assembly from being cooled. The fastening pin of the present invention is especially useful for making a buss connection between a stack of electrical printed circuit boards to carry heat or electrical energy. A simple hole of low tolerance can be made in each board and the fastening pin of the present invention easily placed in position by cooling it to reduce its size. If desired, the end of the pin may be chamfered to enhance the ease of insertion. It is easily removed by running a cooling fluid such as cold gas or Freon through the pin to cause its diameter to decrease so that it can easily be pulled out. Coolant containment can be improved by rotating the slots in the inner and outer tubes so that they do not line up, thus giving a completely closed tube.

One particular advantage of the fastening pin of the present invention is that the holes in the sheets of material being connected need not be of the same size. Each portion of the pin will expand under the force of the heat recoverable alloy until it touches the sides of the hole and presses firmly on them; it cannot expand beyond that point. If different holes have different diameters, then the corresponding portion of the pin will simply open further. As noted above, this property is enhanced by providing slots 15 such as are shown in FIG. 5.

It will be readily apparent to those skilled in the art that the foregoing invention may be modified as to configuration of teh fastener, choice of metals, and otherwise without departing from the concept of the present invention. The embodiment shown and described are thus considered to be illustrative only and not restrictive.

I claim:

1. A fastening pin comprising:
   first and second separate tubular members, telescoped together and in intimate contact, each tubular member having a longitudinal slit through the wall thereof, one of said members comprising heat recoverable metal having a transition temperature and the other of said members comprising spring metal, said member comprised of spring metal being under stress when said member comprised of heat recoverable metal is in the heat recovered condition, said stress being capable of exerting sufficient force to cause dimensional change in said heat recoverable member when it is below its transition temperature.

2. The pin of claim 1 wherein said heat recoverable metal comprises a titanium nickel alloy.

3. The pin of claim 1 wherein said heat recoverable metal comprises a beta brass alloy.

4. The pin of claim 2 wherein said spring metal comprises a beryllium copper alloy.

5. The pin of claim 1 wherein the member comprising heat recoverable metal is positioned inside the other member.

6. The pin of claim 1 wherein the member comprising heat recoverable metal is positioned outside the other member.

7. The pin of claim 1 wherein a third tubular member is positioned over said first and second tubular members, said third tubular member comprising a heat recoverable metal.

8. The pin of claim 1 wherein said members are provided with one or more circumferential slots.

9. A fastening pin comprising:
   a first hollow cylindrical member being split along its length;
   a separate second hollow cylindrical member being split along its length and being positioned over and in intimate contact with the first member;
   the first member comprising a heat recoverable metal having a transition temperature and the second member comprising spring metal whereby the first member determines the lateral dimension of the device when it is heated to above the transition temperature of the metal of the first member, said second member being under stress when said first member is in the heat recovered condition, and the second member stresses the first member and determines the lateral dimension of the device when it is cooled to below the transition temperature of the metal of the first member.

10. The pin of claim 1 wherein said slits are at least partially aligned.

* * * * *